(12) United States Patent
Thompson et al.

(10) Patent No.: US 12,680,848 B1
(45) Date of Patent: *Jul. 14, 2026

(54) MAGMETER AND METHOD OF ASSEMBLY

(71) Applicant: THOMPSON EQUIPMENT COMPANY, INC., Jefferson, LA (US)

(72) Inventors: Todd C. Thompson, New Orleans, LA (US); Thomas Meacham, Jr., Perkasie, PA (US)

(73) Assignee: THOMPSON EQUIPMENT COMPANY, INC., Jefferson, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,500

(22) Filed: Jan. 2, 2025

Related U.S. Application Data

(63) Continuation of application No. 18/520,962, filed on Nov. 28, 2023, now Pat. No. 12,222,230, which is a continuation of application No. 17/946,289, filed on Sep. 16, 2022, now Pat. No. 11,867,544, which is a continuation of application No. 17/182,617, filed on Feb. 23, 2021, now Pat. No. 11,486,747, which is a continuation of application No. 16/181,167, filed on Nov. 5, 2018, now Pat. No. 10,969,260.

(60) Provisional application No. 62/616,946, filed on Jan. 12, 2018, provisional application No. 62/581,385, filed on Nov. 3, 2017.

(51) Int. Cl.
    | | |
    |---|---|
    | *G01F 1/58* | (2006.01) |
    | *E21B 21/08* | (2006.01) |
    | *G01F 1/60* | (2006.01) |

(52) U.S. Cl.
    CPC .............. *G01F 1/584* (2013.01); *E21B 21/08* (2013.01); *G01F 1/60* (2013.01)

(58) Field of Classification Search
    CPC ............. G01F 1/584; G01F 1/60; E21B 21/08
    USPC ....................................... 73/861.12
    See application file for complete search history.

(56) References Cited

U.S. PATENT DOCUMENTS

| | | | | |
|---|---|---|---|---|
| 3,750,468 | A * | 8/1973 | Grauer .................... | G01F 1/588 |
| | | | | 138/140 |
| 4,428,241 | A * | 1/1984 | Davis ........................ | G01F 1/58 |
| | | | | 73/861.12 |
| 7,383,739 | B2 * | 6/2008 | Hofmann ................ | G01F 1/584 |
| | | | | 73/861.12 |
| 7,421,908 | B2 * | 9/2008 | Jarrell ........................ | G01F 1/58 |
| | | | | 73/861.12 |
| 7,637,169 | B2 * | 12/2009 | Shanahan ............... | G01F 1/588 |
| | | | | 73/861.08 |
| 7,779,702 | B2 * | 8/2010 | Shanahan ............... | G01F 25/10 |
| | | | | 73/1.16 |

(Continued)

FOREIGN PATENT DOCUMENTS

| | | | | |
|---|---|---|---|---|
| JP | 2009168539 | A * | 7/2009 | ............... G01F 1/58 |

OTHER PUBLICATIONS

Translation of JP-2009168539-A (Year: 2009).*

*Primary Examiner* — Nathaniel T Woodward
(74) *Attorney, Agent, or Firm* — Garvey, Smith & Nehrbass, Patent Attorneys, L.L.C.; Julie Rabalais Chauvin; Seth M. Nehrbass

(57) ABSTRACT

The present invention relates to magnetic flowmeters. More particularly, the present invention relates to a magnetic flowmeter specifically designed for the hydraulic fracturing industry that is capable of withstanding a variety of corrosive slurries, acids, bases, and solvents including a liner including partially stabilized magnesium zirconia (MgPSZ).

20 Claims, 21 Drawing Sheets

(56)         References Cited

U.S. PATENT DOCUMENTS

| | | | | |
|---|---|---|---|---|
| 7,798,015 | B2 * | 9/2010 | Zingg ..................... | G01F 1/588 |
| | | | | 73/861.12 |
| 9,163,967 | B2 * | 10/2015 | Lucas ..................... | G01F 1/588 |
| 9,239,255 | B2 * | 1/2016 | Walbrecker ............... | G01F 1/58 |
| 9,410,830 | B2 * | 8/2016 | Rovner ................... | G01F 1/584 |

* cited by examiner

HAT
(TOP VIEW)

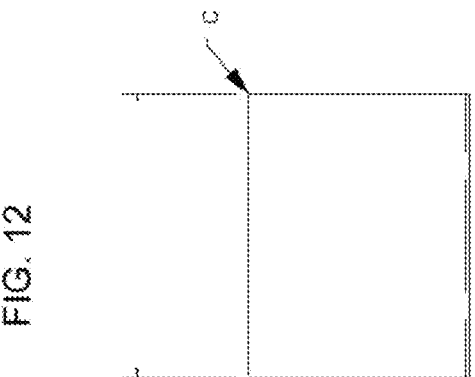
FIG. 12
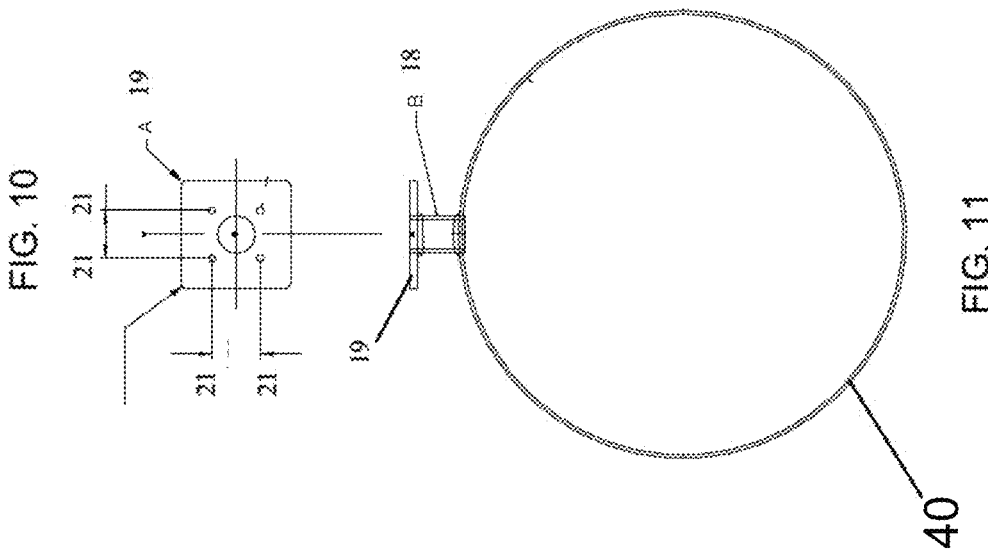
FIG. 10
FIG. 11
40
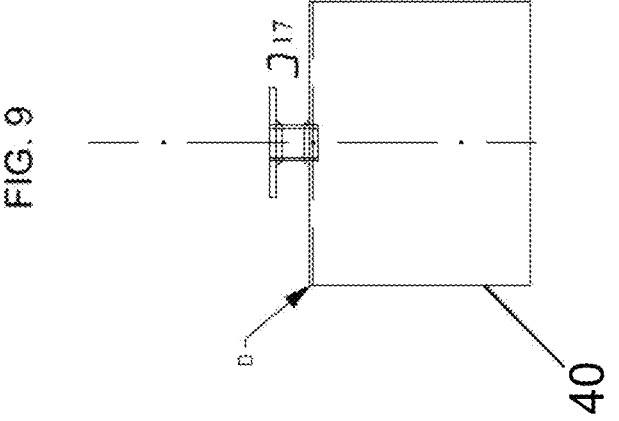
FIG. 9
40

FIG. 15                           FIG. 16
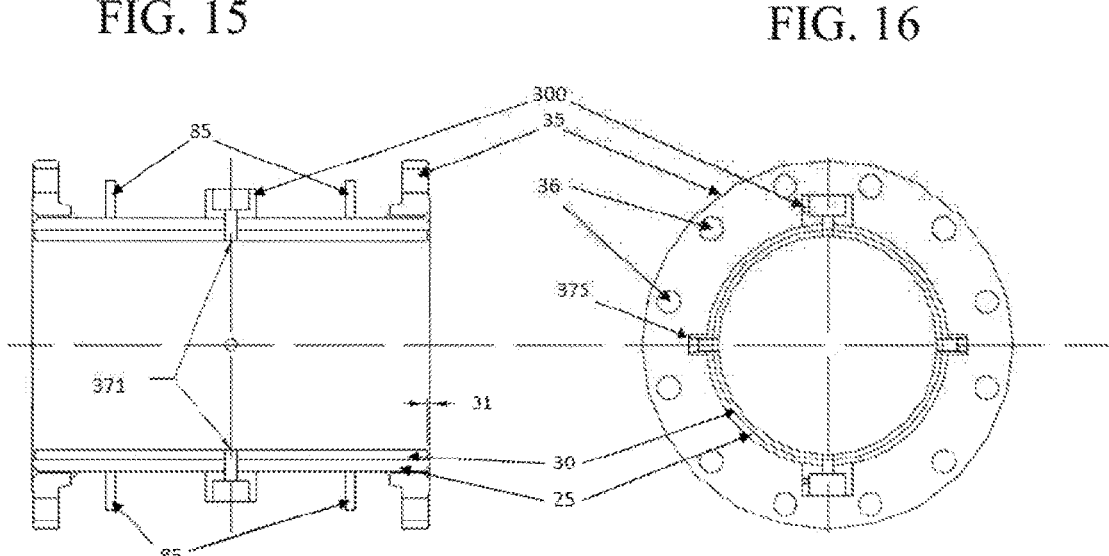

FIG. 20
FIG. 21
FIG. 22
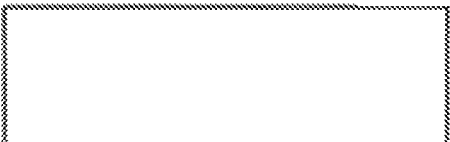
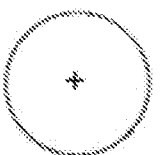
FIG. 23

WELD STUDS - A

"B" TYP 8 PLACES

TYP 8 PLACES "A"

300

35

700

FIG. 38
FIG. 37
FIG. 36
FIG. 39
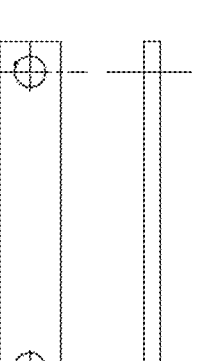

MAGMETER AND METHOD OF ASSEMBLY

CROSS-REFERENCE TO RELATED APPLICATIONS

This is a continuation of U.S. patent application Ser. No. 18/520,962, filed 28 Nov. 2023 (issued as U.S. Pat. No. 12,222,230 on 11 Feb. 2025), which is a continuation of U.S. patent application Ser. No. 17/946,289, filed 16 Sep. 2022 (issued as U.S. Pat. No. 11,867,544 on 9 Jan. 2024), which is a continuation of U.S. patent application Ser. No. 17/182,617, filed 23 Feb. 2021 (issued as U.S. Pat. No. 11,486,747 on 1 Nov. 2022), which is a continuation of U.S. patent application Ser. No. 16/181,167, filed 5 Nov. 2018 (issued as U.S. Pat. No. 10,969,260 on 6 Apr. 2021), which claims the benefit of U.S. Provisional Patent Application Ser. No. 62/581,385, filed 3 Nov. 2017, and U.S. Provisional Patent Application Ser. No. 62/616,946, filed 12 Jan. 2018, which are hereby incorporated herein by reference, and priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to magnetic flowmeters. More particularly, the present invention relates to a magnetic flowmeter specifically designed for the hydraulic fracturing industry that is capable of withstanding a variety of corrosive slurries, acids, bases, and solvents.

2. General Background

Magnetic flowmeters, electromagnetic flowmeter, or magmeters are commonly used for measuring volumetric flow rates of fluids containing charged particles in process control industries including, but not limited to, water treatment facilities, chemical processing, pharmaceutical manufacturing, food and beverage production, and liquid hydrocarbon processing and extraction techniques.

Magnetic flowmeters functionally vary from other flow measurement technologies in that volumetric flow is measured by application of Faraday's Law capitalizing upon electromagnetic interactions of charged particles within a fluid as it passes through a magnetic field orthogonal to the direction of flow. The magnetic field causes a separation of the charged particles within a cross section of the pipe. Once separated, the flow of charged particles are attached to the electrodes placed orthogonal to the magnetic field results in an electromotive force in the electrodes further resulting in a voltage differential between the electrodes. The flow rate is a function of the voltage drop measured across the electrodes.

The advantage of magnetic flowmeters over other forms of flowmeters is twofold. First, magnetic flowmeters can operate in erosive and/or corrosive environments. Second, magnetic flowmeters do not mechanically hinder flow and, therefore, do not cause pressure drops.

Magnetic flowmeters can vary functionally depending upon a variety of parameters. One parameter of particular interest is the material used for the inner lining of the tube. Depending upon the application, the materials used for lining can vary from rubber to polyurethane. While most liner materials are satisfactory for many fluids, the useful life is significantly shortened when the fluid is under extremely high temperatures and/or pressures or contains corrosive and/or erosive material. Under these circumstances, ceramics are often employed to prolong the useful life of the product. For example, in hydraulic fracturing, the primary magnetic flowmeter is subjected to extremely harsh chemicals and slurries. It is currently common practice to use alumina or yttria zirconia as the inner lining of a magnetic flowmeter. However these materials are inferior/problematic because they wear out easily and corrode due to the harsh conditions in which they are used (e.g., high temperatures and/or pressures).

Traditionally, companies develop a flow measurement system comprising a Primary (flow tube with magnetic system and sensing electrode) and a Secondary (power supply with a synchronized measurement circuitry). In use, the Primary will wear out long before the Secondary, or the severity of the application will require a Primary that is not offered by that company. When a company is developing a flow measurement system, electrical approvals are sought to verify that the system conforms to the requirements outlined in the National Electric Code.

The present invention includes a Primary designed to work in severe applications with a Secondary from another manufacturer. The resulting system will meet the requirements for operation in Hazardous areas designated as Class I Division 2 (a recognized industry requirement) when the Secondary meets this requirement.

The present invention is designed to be tolerant or configurable to the electrical properties of the mating Secondary and is designed to be reversely compatible unit with the mating Secondary (i.e., the present invention can be tailored to mate with the properties of different, specific Secondaries).

The present invention is tested and approved to meet the guidelines of Class I Division 2 Hazardous Location (as defined by the US National Electrical Code, Article 500) with Intrinsically Safe electrodes as a standalone device. Any Secondary that carries the Class I Division 2 approval and meets the listed requirements is acceptable for installation and mating with the present invention.

The present invention improves upon existing magnetic flowmeters because it is tailored for the fracking industry with a lining of preferably partially stabilized magnesium zirconia (MgPSZ), an abrasion resistant ceramic trim that exceeds the capabilities of alumina or yttria zirconia. The present invention is capable of withstanding a variety of corrosive slurries, acids, bases, and solvents.

The following US and Foreign Patents and Patent Application Publications are incorporated herein by reference: U.S. Pat. Nos. 3,750,468; 7,624,794; 7,637,169; EP 0 660 919; US 2008/0035332; WO 2009/094156.

BRIEF SUMMARY OF THE INVENTION

The present invention relates to magnetic flowmeters. More particularly, the present invention relates to a magnetic flowmeter specifically designed for the hydraulic fracturing industry that is capable of withstanding a variety of corrosive slurries, acids, bases, and solvents and can measure extremely abrasive slurries in mining, dredging, fracking, and oil and gas exploration without measuring oil and gas.

The present invention includes a Primary designed to work in severe applications with a Secondary from another manufacturer. Specifically, the present invention is designed to be tolerant or configurable to the electrical properties of the mating Secondary (examples of which are Endress Hauser, Yokogawa, and Rosemount. The present invention is unique in that the magnetic flowtube is designed to work with a variety of manufacturers' transmitters (electronics that energize magnetic coil and receive and transmit a signal).

The present invention improves upon existing magnetic flowmeters because it is tailored for the fracking industry with a lining of preferably partially stabilized magnesium zirconia (MgPSZ) and an abrasion resistant ceramic trim that exceeds the capabilities of alumina or yttria zirconia. All magnetic flow meters have an insulating lining in the bore of the flow tube to isolate the signal produced in the magnetic field by the flowing conductive fluid. A preferred embodiment of the present invention preferably has this type of insulating lining in the area of the magnetic field with preferably metal pipe in the remaining length of the bore. What is unique about the present invention is the aspect of electrically conductive pipe in part of the bore of the magmeter. In preferred embodiments of the present invention, the electrically conductive pipe could be either upstream, or downstream of the magnetic field, or both. One benefit of the present invention is that the electrically conductive pipe eliminates the need for grounding rings. Grounding of the magmeter to the flowing fluid is required to product the voltage differential for the signal.

In a preferred embodiment of the present invention, the single piece of partially stabilized magnesium zirconia ceramic liner is preferably mechanically affixed to the metal tube via heat shrink (no adhesives). The present invention is capable of withstanding a variety of corrosive slurries, acids, bases, and solvents. A preferred embodiment of the present invention (also known as the severe application meter or SAM) preferably has a ceramic liner and tungsten carbide electrodes.

In a preferred embodiment of the present invention that is preferably used for larger lay length meters, and most preferably in an AC version of the magmeter, the ceramic liner does not extend the full length of the metal tube. Depending upon the mating secondary, though, the ceramic liner can extend the full length of the metal tube. The unlined portion of the tube can serve to ground the liquid, which improves upon other grounding techniques (such as ground rings on the end of the flange or ground electrodes on an internal circuit) because of increased contact area with the fluid.

A preferred embodiment of the present invention has solid, polished tungsten carbide billet signal electrodes for low noise in slurries and superior wear resistance. An alternate preferred embodiment of the present invention does not include the tungsten carbide billet electrodes.

The present invention's design is for flexibility using various combinations of liner material, electrode material, and other variables.

In a preferred embodiment of the present invention, size range can be between 4" and 12", with a preferred length of 10". In various alternative preferred embodiments of the present invention, the length can be 4", 6", 8", 10", or 12".

The present invention preferably includes a tube with electrically insulated lining, magnetic coils with magnetic return path, sensing electrodes, grounding, housing to protect from the elements, and a junction box for electrical termination.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a preferred embodiment of the shell of the present invention;

FIG. 10 is a top view of a preferred embodiment of the top of the neck of the shell of the present invention;

FIGS. 11 and 12 are various preferred embodiments of the shell of the present invention;

FIGS. 13 and 14 show various views of an alternate preferred embodiment of the present invention;

FIGS. 15 and 16 show various views of an alternate preferred embodiment of the present invention with the lining installed;

FIGS. 20 and 21 show views of a preferred embodiment of the ground electrode of the present invention;

FIGS. 22 and 23 shows views of a preferred embodiment of the sensing electrode of the present invention;

FIGS. 24 and 25 show various views of the stud weldment-coil hold down process of the present invention;

FIGS. 36-39 show various views of a preferred embodiment of the present invention with the magnetic coils attached to the housing.

DETAILED DESCRIPTION OF THE INVENTION

Figure 1:
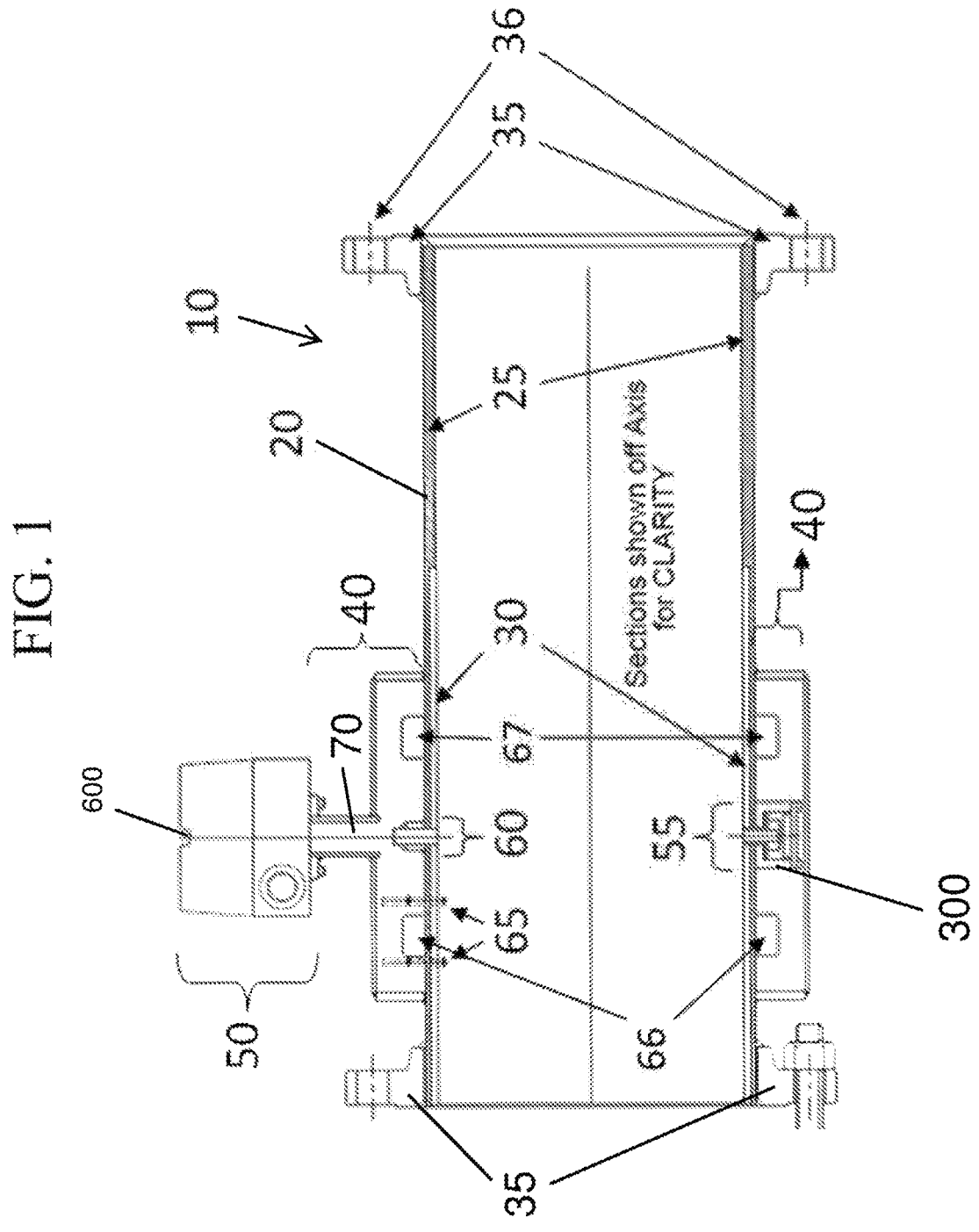
FIGS. 1 and 2 are side, cutaway view of a preferred embodiment of the apparatus of the present invention.
Figure 2:
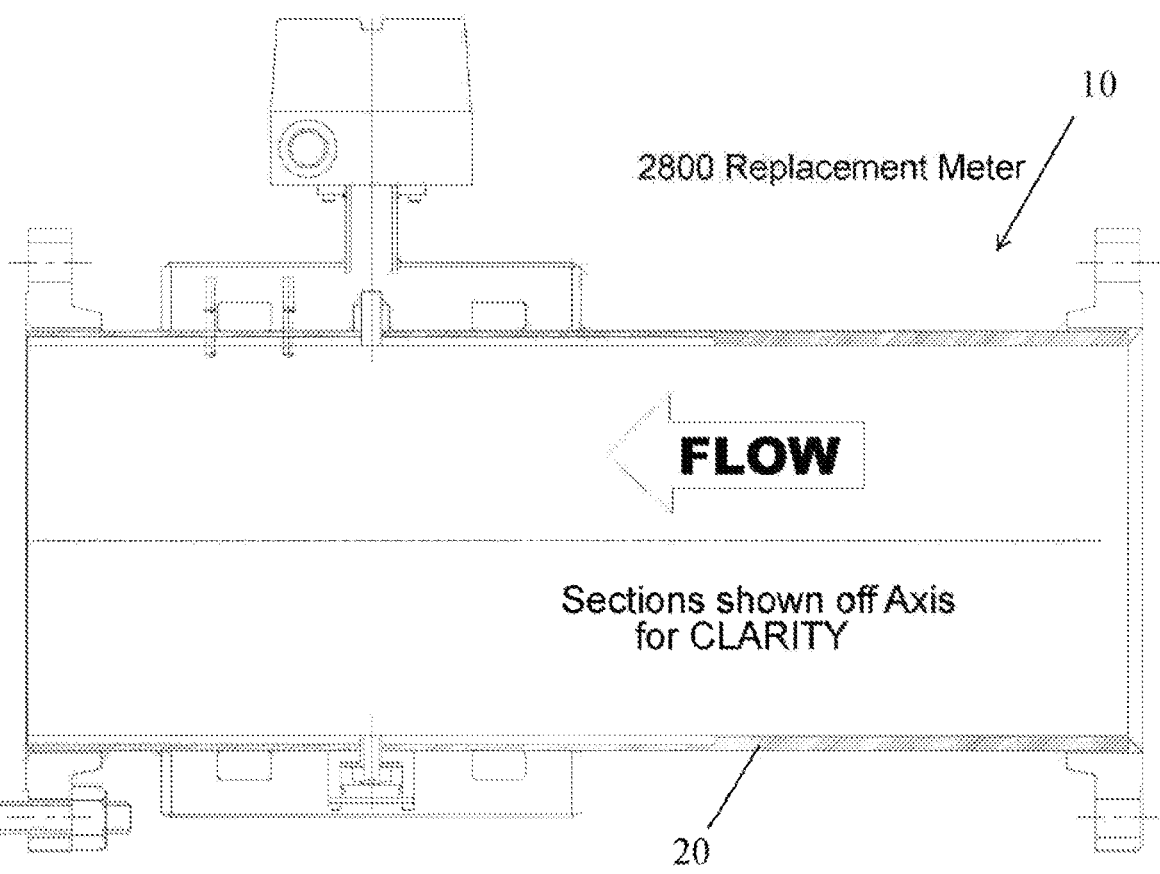

The present invention has various embodiments that comprise different combinations of liner material, electrode material, and other variables. The components of the present invention that are best tailored for fracking are highlighted in italics in the tables below.

The present invention preferably includes a housing, sensor, an electronics interface, lining, and electrode. More specifically, the present invention preferably includes a tube with electrically insulated lining, magnetic coils with magnetic return path, sensing electrodes, grounding, housing to protect from the elements, and a junction box for electrical termination.

In a preferred embodiment of the present invention, the sensor design component

| | | |
|---|---|---|
| A | ABB - F&P - Kent Taylor | |
| E | Endress Hauser | |
| F | Foxboro 2800 | |
| K | Krohne | |
| R | Rosemount 8705/8787 | |
| T | Thompson Equipment Company | |
| Y | Yokogawa Admag | |

In a preferred embodiment of the present invention, the electronics interface component of the present invention could be any one of the following:

| | | |
|---|---|---|
| A | ABB - F&P - Kent Taylor | |
| E | Endress Hauser | |
| F | Foxboro 96 | |
| K | Krohne | |
| R | Rosemount 8712 | |
| Y | Yokogawa Admag | |

In a preferred embodiment of the present invention, the lay length of the present invention could be any one of the following:

| | |
|---|---|
| S | ISO 13359 Lay Length |
| C | Custom (Designates the lay length prior to ISO 13359) |

In a preferred embodiment of the present invention, the line size (aka diameter, standard pipe size) of the present invention could be any one of the following:

| | |
|---|---|
| 015 | ½" ANSI B16.5 or AWWA C207 |
| 025 | 1" ANSI B16.5 or AWWA C207 |
| 032 | 1¼" ANSI B16.5 or AWWA C207 |
| 040 | 1½" ANSI B16.5 or AWWA C207 |
| 050 | 2" ANSI B16.5 or AWWA C207 |
| 080 | 3" ANSI B16.5 or AWWA C207 |
| 100 | 4" ANSI B16.5 or AWWA C207 |
| 150 | 6" ANSI B16.5 or AWWA C207 |
| 200 | 8" ANSI B16.5 or AWWA C207 |
| 250 | 10" ANSI B16.5 or AWWA C207 |
| 300 | 12" ANSI B16.5 or AWWA C207 |
| 350 | 14" ANSI B16.5 or AWWA C207 |

-continued

| | |
|---|---|
| 400 | 16" ANSI B16.5 or AWWA C207 |
| 450 | 18" ANSI B16.5 or AWWA C207 |
| 500 | 20" ANSI B16.5 or AWWA C207 |
| 550 | 22" ANSI B16.5 or AWWA C207 |
| 600 | 24" ANSI B16.5 or AWWA C207 |
| 650 | 26" ASME B16.47 Series A or AWWA C207 |
| 700 | 26" ASME B16.47 Series A or AWWA C207 |
| 750 | 30" ASME B16.47 Series A or AWWA C207 |
| 800 | 32" ASME B16.47 Series A or AWWA C207 |
| 900 | 36" ASME B16.47 Series A or AWWA C207 |
| 950 | 38" ASME B16.47 Series A or AWWA C207 |
| 001 | 40" ASME B16.47 Series A or AWWA C207 |

In a preferred embodiment of the present invention, the flange 35 component of the present invention could be any one of the following:

| | | |
|---|---|---|
| A | ANSI/ASME Cl 150 | 285 psi MAX |
| B | ANSI/ASME Cl 300 | 740 psi MAX |
| C | AWWA C207 Cl. D | 150 psi MAX |
| X | Special | Per Flange Spec |
| V | Grooved End Flange (such as Victaulic OGS) | Per Coupling Specification 500 psi MAX |

In a preferred embodiment of the present invention, the flange material of the present invention could be any one of the following:

| | | |
|---|---|---|
| C | Carbon Steel | Flange and Exposed tube are painted |
| S | Stainless Steel 304/304L | No Paint |
| X | Special Flange Materials | |
| W | Wafer | |

In a preferred embodiment of the present invention, the lining 30 of the present invention could be any one of the following:

| | | |
|---|---|---|
| E | PTFE | <300° F. (Not Full Vaccumm Rated) |
| T | Tefzel | <266° F. |
| A | PFA | <300° F. |
| L | Linatex | <190° |
| N | Neoprene | |
| P | Polyurethane | |
| H | Hard Rubber | |
| C | Ceramic Pipe | MgPSZ |
| B | Ceramic Brick | |

In a preferred embodiment of the present invention, the electrode(s) of the present invention could be any one of the following:

| | |
|---|---|
| S | 316 Stainless Steel |
| B | Hastelloy B-3 |
| H | Hastelloy C-4 (Not Hastelloy C-276) |
| T | Tantalum |
| P | Platinum - 10% Iridium (Iridium for Strength) |
| C | Conductive Low Noise |
| A | Tungsten Carbide coated Hatelloy B-3 |
| W | Bilet Tungsten Carbide |
| X | Electrodeless |

In a preferred embodiment of the present invention, the line size (aka diameter) of the severe application meter (SAM) is preferably 4"-12" with preferably a fully rated ASME B16.5 class 150 flange connections. In a preferred embodiment of the present invention, the accuracy of the SAM is preferably ½% of rate (1-10 M/sec scale) with a DC signal converter. In a preferred embodiment of the present invention, the accuracy of the SAM is preferably 1% of rate (1-10 M/sec scale) with an AC signal converter. In a preferred embodiment of the present invention, the pressure rating is about 285 psi at temperatures up to about 100° F. In a preferred embodiment of the present invention, the temperature rating is about 400° F. at pressure up to about 200 psi. In a preferred embodiment of the present invention, the max temperature gradient is about 100° F. per minute. In a preferred embodiment of the present invention, the wetted materials are tungsten carbide electrodes and the lining is preferably magnesia partially stabilized zirconia (MgPSZ). In a preferred embodiment of the present invention, the present invention can operate in an environment with a temperature range from about 0° F. to 140° F. It can withstand submergence in accordance with IP68/NEMA 6P and preferably has an epoxy paint exterior.

A preferred method of assembly of the present invention is as follows: beginning with a pipe 25 (preferably metal) that has a flange 35 already attached (preferably welded) on either end of pipe 25 and with at least one boss 300 already attached to the pipe (preferably welded to the pipe). Threaded studs that will attach magnetic coils to pipe are welded to pipe already. Magnetic coils 400/metal rings 66, 67 are affixed to pipe 25 and are held in place with brackets placed over threaded studs.

Then, pipe 25 is lined with a liner 30. Preferably, the lining process is as follows: pipe 25 goes into the oven which is heated to about 500° F. and stays there for about 15 minutes (the temperature is checked with an infrared thermometer). The pipe 25 is pulled out of the oven and liner 30 is mechanically affixed to the metal tube/pipe 25 via heat shrink (no adhesives). In a preferred embodiment of the present invention, a single piece of partially stabilized magnesium zirconia ceramic liner is preferably mechanically affixed to the metal tube/pipe 25 via heat shrink (no adhesives). A stop is used to ensure that the liner is offset about 0.05" from both flange ends. The temperature is checked, preferably with an infrared thermometer, until it is below 150° F. Then, holes are drilled out preferably with a diamond sleeve drill and preferably using the bosses 300 for alignment. In a preferred embodiment, the pipe has 4 bosses 300 affixed to it, and the holes are drilled in the now lined pipe using the four bosses for alignment (preferably, 2 of these bosses are for ground electrodes and 2 bosses are for sensing electrodes).

Then, the ground electrodes 590, preferably 2, are welded into place into bosses 300. Then, the sensing electrodes 580 are installed. The electrode wiring circuits of all electrodes, ground and sensing, are completed. Shell/case 40 will be affixed to (preferably welded to) magnetic coils 400, and the leads from the coils and electrode wires come up through the neck of the shell. And then the junction box is bolted to the neck.

The wires are all soldered to a two board PCB (printed circuit board) stack that has the wiring terminals. Then the neck is potted with epoxy to protect the coils, electrodes, and associated circuitry from water ingress. Next, the meter is flow calibrated, which is when a calibration constant is developed that allows the meter to function with whichever transmitter/secondary the customer specifies: Rosemount, Endress+Hauser, Yokogawa, etc., etc. The meter is then painted, prepped, and shipped.

FIG. 15 shows setback of ceramic liner to flange face 31.

FIG. 1 shows a preferred embodiment of the present invention magmeter 10. Magmeter 10 includes housing 20 containing pipe 25 and ceramic liner 30 that lines pipe 25. In the embodiment shown in FIG. 1, it can be seen that liner 30 does not extend the whole length of pipe 25, but liner 30 can extend the entire length of pipe 25 as seen in FIG. 15. Flanges 35 can be seen on each end of pipe 25. Flanges 35 contain flange holes 36. Bosses 300 are affixed to pipe 25. Electrodes 590 are welded into place within bosses 300. Shell 40 is affixed to (preferably welded to) magnetic coils 65, 66, 400, and the leads from the coils and electrode wires come up through the neck 70 of the shell 40. Junction box 50 is bolted to the neck 70 of shell 40.

Figure 31:
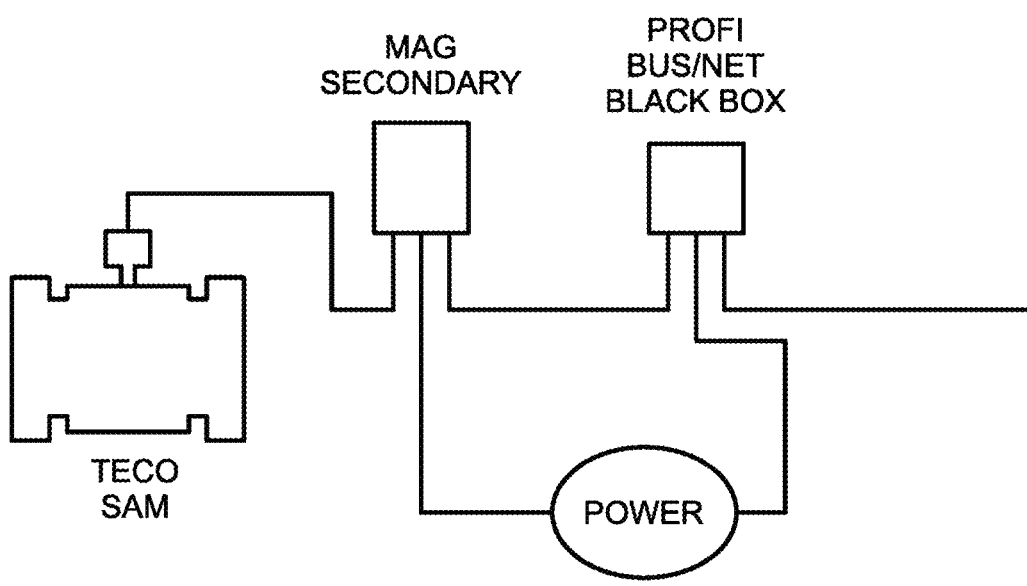
FIG. 31 shows a preferred embodiment of the present invention electronically coupled to a secondary communication device that translates an incoming protocol into an outgoing protocol, similarly to how a black box operates.
Figures 32, 33:
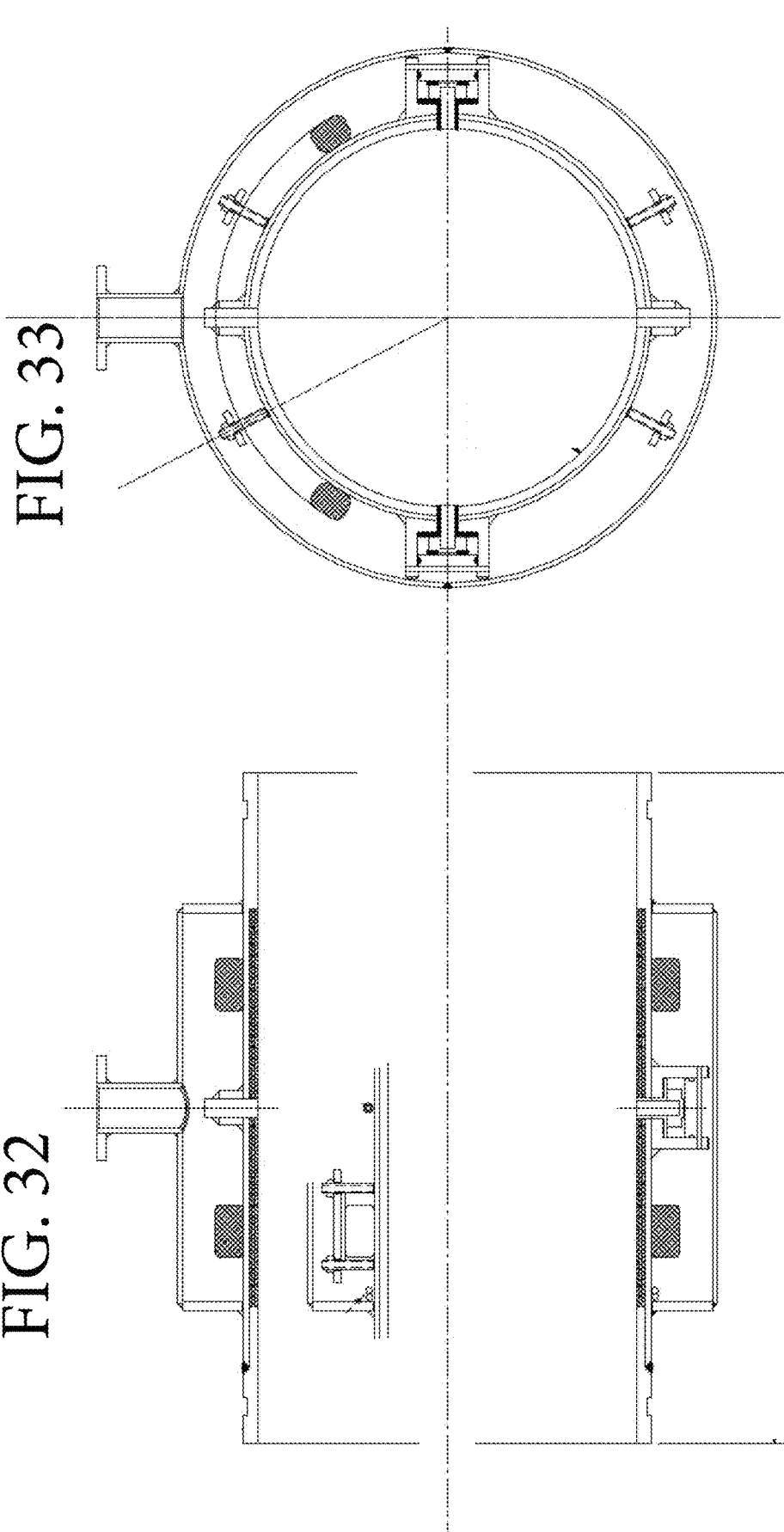
FIG. 32 is a partial section view of an alternate preferred embodiment of the present invention with grooved end flanges.
FIG. 33 is a partial end view of an alternate preferred embodiment of the present invention with grooved end flanges.

FIG. 31 shows a communication device that translates an incoming protocol into an outgoing protocol, similarly to how a black box operates.

Figures 3, 4:
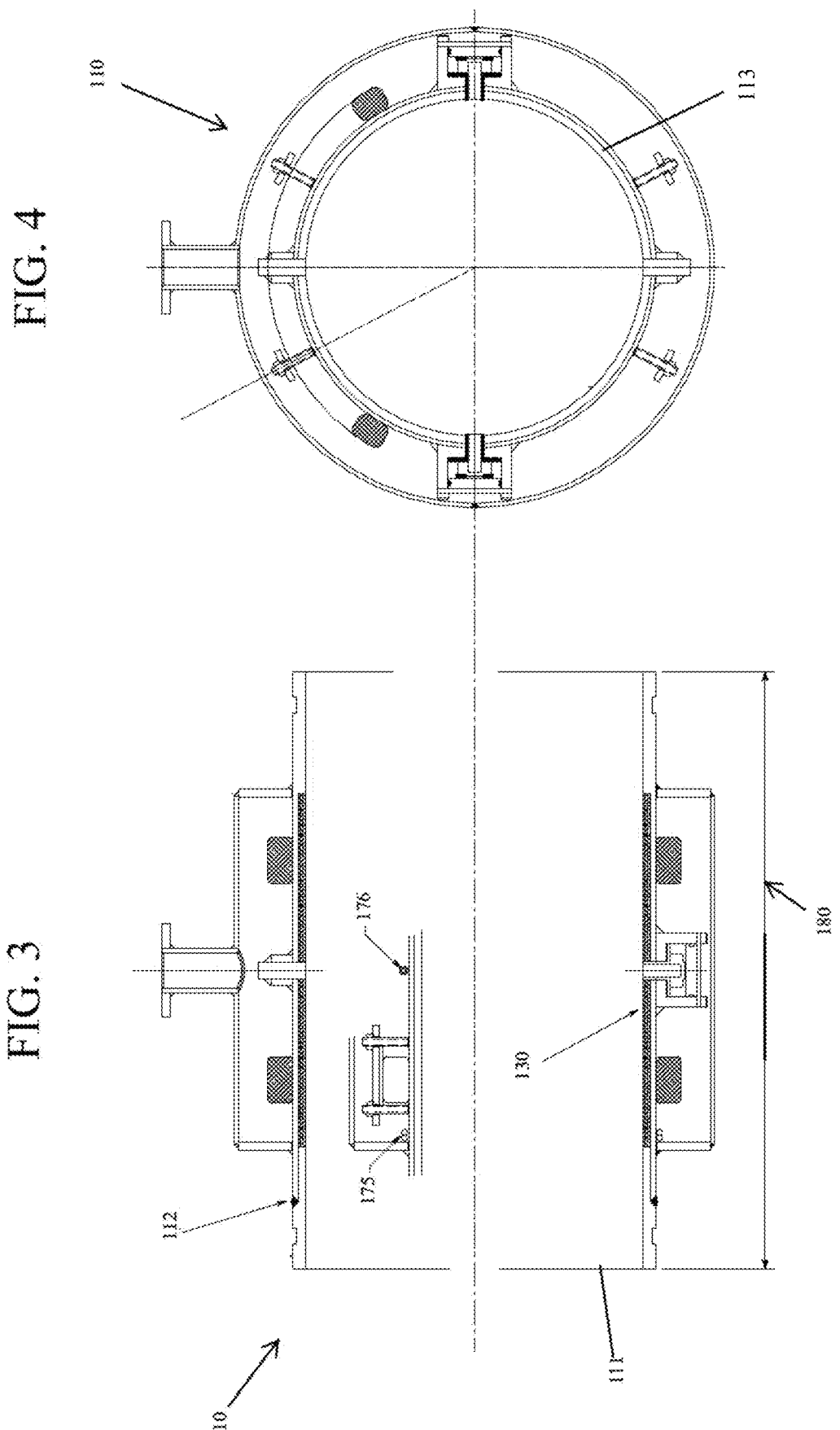
FIG. 3 is a partial section view of an alternate preferred embodiment of the present invention with grooved end flanges.
FIG. 4 is a partial end view of an alternate preferred embodiment of the present invention with grooved end flanges.

FIGS. 3, 4, 32, and 33 shows a partial section of a grooved end flange (e.g., Victaulic®) severe application meter (SAM) 110 with lay length 180 and including Victaulic sleeve 111 and ceramic sleeve 130. In a preferred embodiment of the present invention, lay length 180 is preferably about 17.72 inches long (lay length 180 is the length from flange 35 at one end to flange 35 at the other end). As shown in FIG. 4, this grooved end flange SAM 110 preferably has an inner diameter of about 10 inches and includes ceramic sleeve 113. Ceramic sleeve 130 preferably has a length of about 10.5 inches. Victaulic® SAM 110 includes coil wires 175 and electrode wire 176. The exterior of this grooved end flange SAM 110 has 112 MIG weld sleeve body. In a preferred embodiment of the present invention, 112 weld sleeve body preferably has 309 SS Filler wire.

Figure 5:
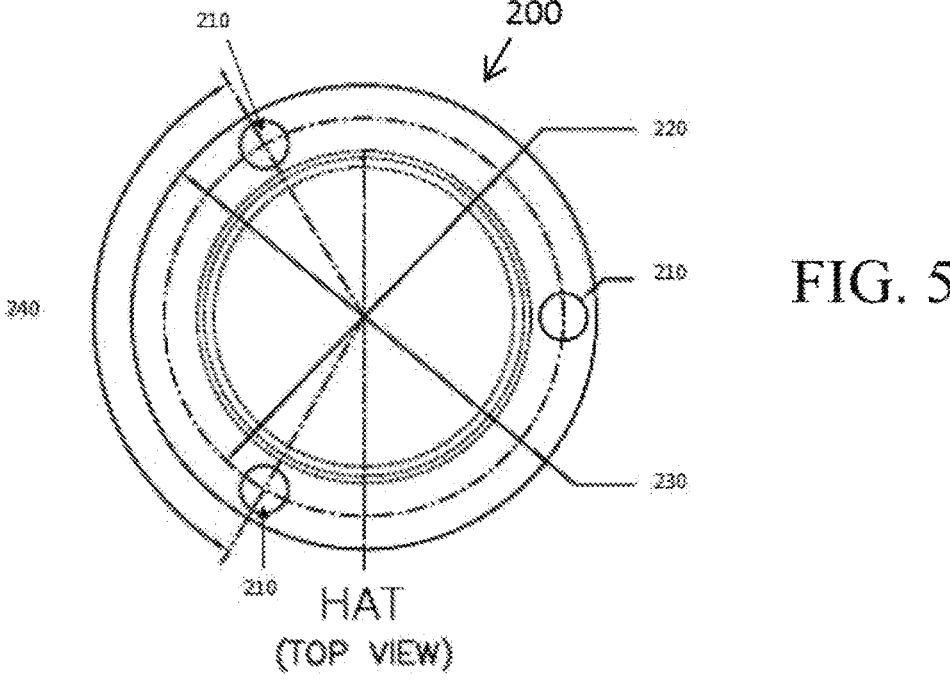
FIGS. 5 and 6 show various views of a preferred embodiment of the hat of the present invention.

FIGS. 5 and 66 show a preferred embodiment of hat 200 that holds electrode 580, 590 into boss 300. In a preferred embodiment, hat 200 includes at least one clearance hole for hold down screws 210. FIG. 5 also shows bolt circle of hold down screws 220. In a preferred embodiment of the present invention, thickness 250 of hat 200 is preferably about ¼" to 1". FIG. 5 shows outside diameter 230 of hat 200, which, in a preferred embodiment, is the same as outside diameter 325 of boss 300. In a preferred embodiment of the present invention, hat 200 is screwed into boss 300 with three screws.

Figures 7, 8:
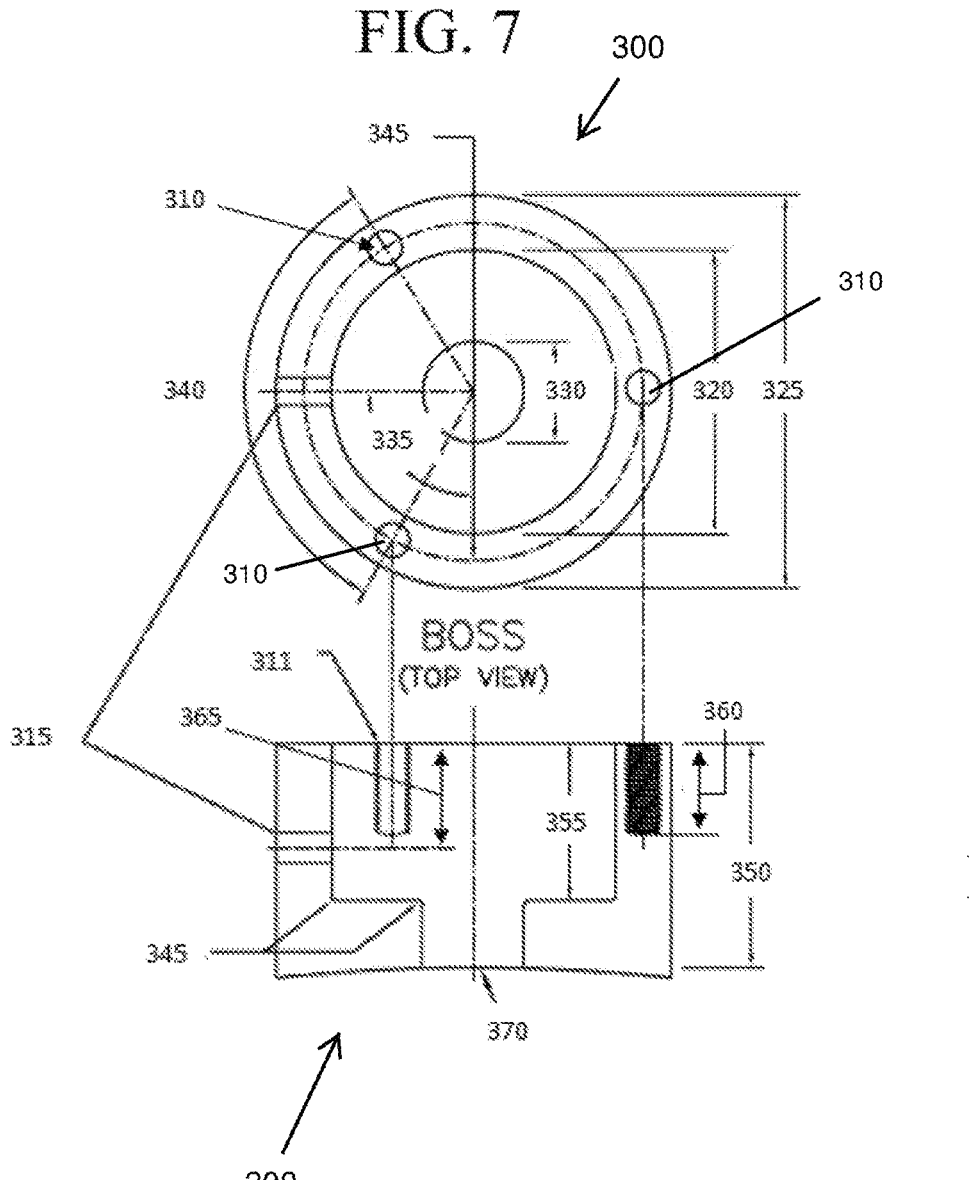
FIGS. 7 and 8 show various views of a preferred embodiment of the boss of the present invention.

FIGS. 7 and 8 are detailed views of boss 300 with the most preferred dimensions indicated in FIGS. 37 and 38. In a preferred embodiment, boss 300 includes at least one threaded hole for hold down screws 310. These holes 310 preferably align with clearance holes 210 of hat 200. Boss 300 preferably includes 10-32 UNF-2B 311. As shown in FIGS. 7 and 8 in a preferred embodiment, on a lateral side of boss 300 is a hole for an electrode wire 315. Preferably in the center of the top of boss 300 is hole for electrode insulator 330. FIG. 8 shows vertical datum 345 and radius of mating pipe 370.

FIGS. 9, 11, and 12 show a preferred embodiment of the shell 40 of the present invention. FIG. 9 shows a preferred embodiment of the top half of shell 40, and FIG. 12 shows a preferred embodiment of the bottom half of shell 40. The length of shell 40 is about 10.5 inches. Shell 40 preferably has an inner diameter of about 14 inches. The top of shell 40 preferably has a ⅛ inch CRS Steel Plate. The bottom of shell 40 preferably has a ⅛ inch CRS Steel Plate. Attached to the top of shell 40 is a mounting element 17, as shown in FIGS. 9 and 11, that junction box 50 will attach to. Mounting element 17 includes neck 70 and plate 19 that sits atop neck 70 and is welded to neck 70 preferably by a ⅛ inch continuous fillet weld. Neck 70 is preferably a 1 inch IPS steel pipe schedule 40×2.25 long. Plate 19 is shown in detail in FIG. 10 and is preferably a CRS Plate ¼ inch thick and 2.75 inches by 2.75 inches. Plate 19 preferably has openings 21. In a preferred embodiment, plate 19 has 4 openings that are spaced 1.75 inches apart and allow for plate 19 to be drilled to the top of neck 70.

Some of the reference numerals in the figures refer to dimensions rather than element in the figures.

The dimensions in FIG. 5 can be as follows:

clearance hole for hold down screws 210: ⅛" to ⅜";

circumferential distance 240 between clearance holes 210: ⅛" to ½"

Figure 6:
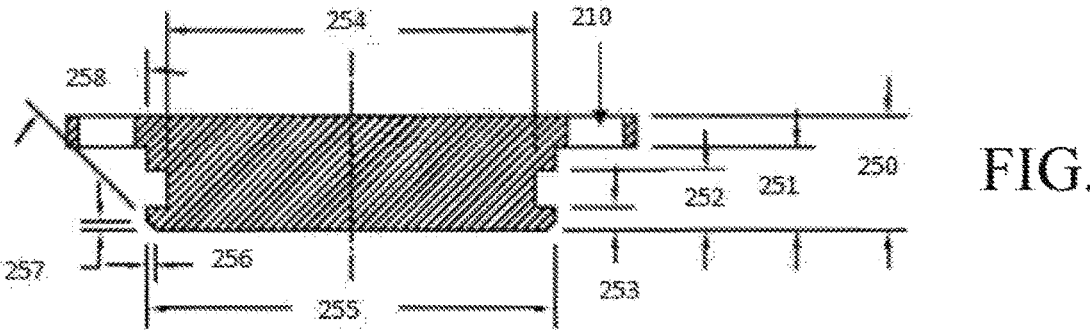

The dimensions in FIG. 6 can be as follows:

210: ½" to 2⅝";

thickness 250 of hat 200: ¼" to 1";

distance 251: ⅛" to ⅞";

dimension 252: ⅛" to ⅞";

dimension 253: ¹⁄₃₂" to ⅞";

dimension 254: ⅜" to 3";

dimension 255: ⅜" to 3";

dimension 256: 0" to ½";

dimension 257: 0" to ½"; and dimension 258: 0 to 90 degrees.

The dimensions in FIG. 7 can be as follows:

inside diameter 320 of boss 300: ⅜" to 3";

outside diameter 325 of boss 300: 1" to 3";

hole for electrode insulator 330: ¼" to ¾";

angle locating electrode wire hole 335: 0 to 90 degrees; and angle locating angular spacing of hold down screws 340: 0 to 180 degrees.

The dimensions in FIG. 8 can be as follows:

inside diameter 320 of boss 300: ⅜" to 3";

height 350 of boss 300: 1" to 4";

depth 355 of boss 300: 1" to 4";

depth 360 of threaded holes for hold down screws 310: ³⁄₁₆" to 1½"; and location of electrode wire hole 365: ⅛" to 2".

The dimensions in FIG. 13 can be as follows:

length 80 between end flanges 35: 7½" to 36"; and length 81 between rings 85: 6" to 18".

The dimensions in FIG. 18 can be as follows:

machined electrode head 505: ½" to 2";

length 518 between top of electrode head 503 and middle of location of electrode wore hold 515: ⅛" to ⅝";

520: ¼" to ¾"; and

525: ¼" to 2½".

The dimensions in FIG. 19 can be as follows:

515: ⅛" to ⅜";

530: ½" to 2½"; and

535: ³⁄₁₆" to ¾".

The dimensions in FIG. 26 can be as follows:

length 660 between hold down holes 630: ¾" to 4"; and length 665 between hold down holes 630: ¾" to 4".

Figures 27, 28:
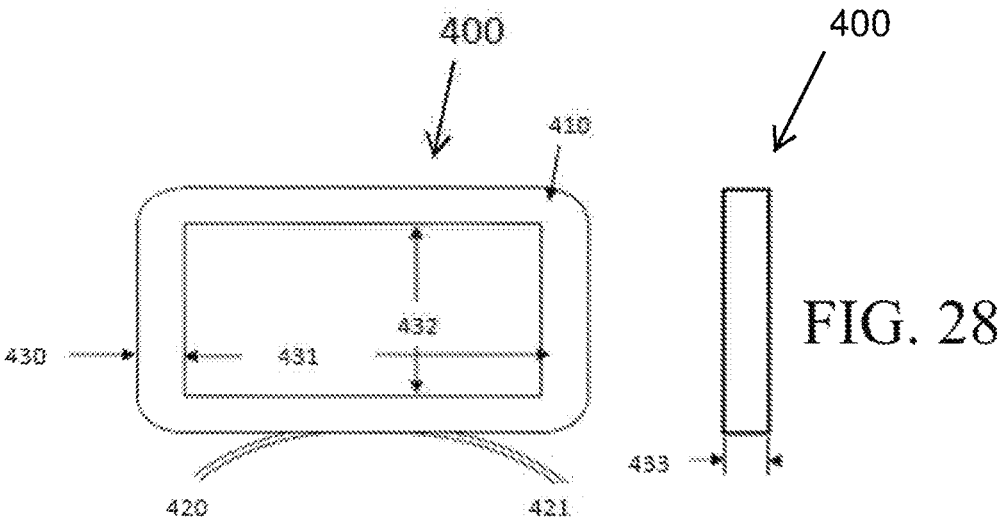
FIGS. 27 and 28 show preferred embodiments of the magnetic coils of the present invention.
Figure 29:
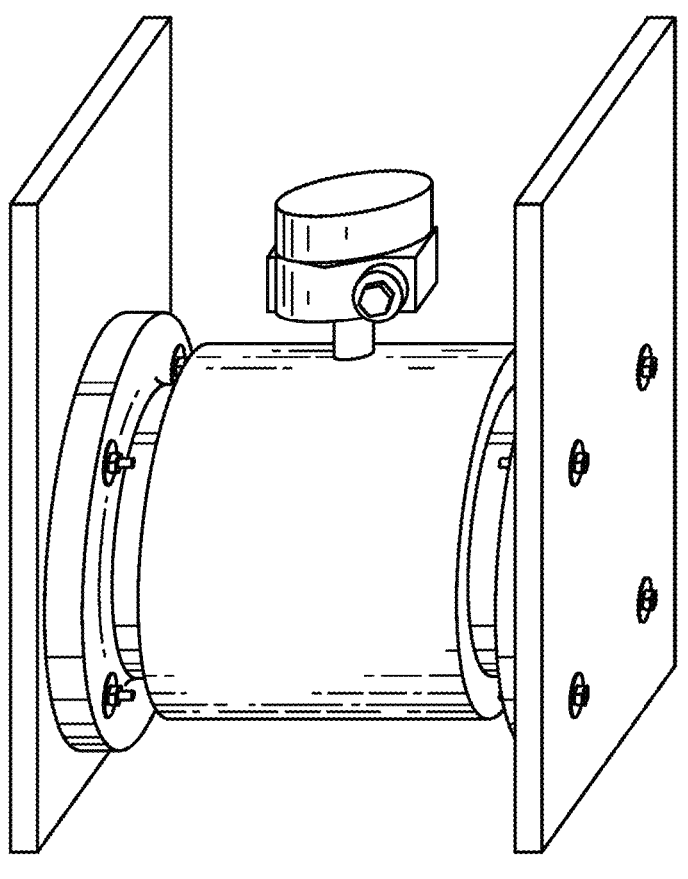
FIGS. 29 and 30 show preferred embodiments of the present invention.
Figure 30:
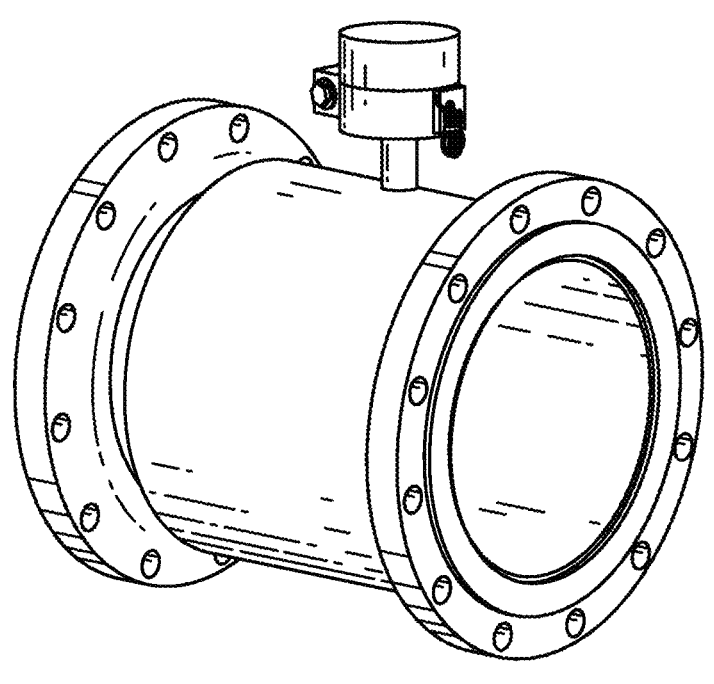

The dimensions in FIG. 27 can be as follows:

thickness 430 of windings 410: ⅜" to 2";

width 431 of coil 400: 5" to 24"; and length 432 of coil 400: 3" to 16".

The dimensions in FIG. 28 can be as follows:

thickness 433 of coil 400: ⅜" to 2".

Figures 13, 14:
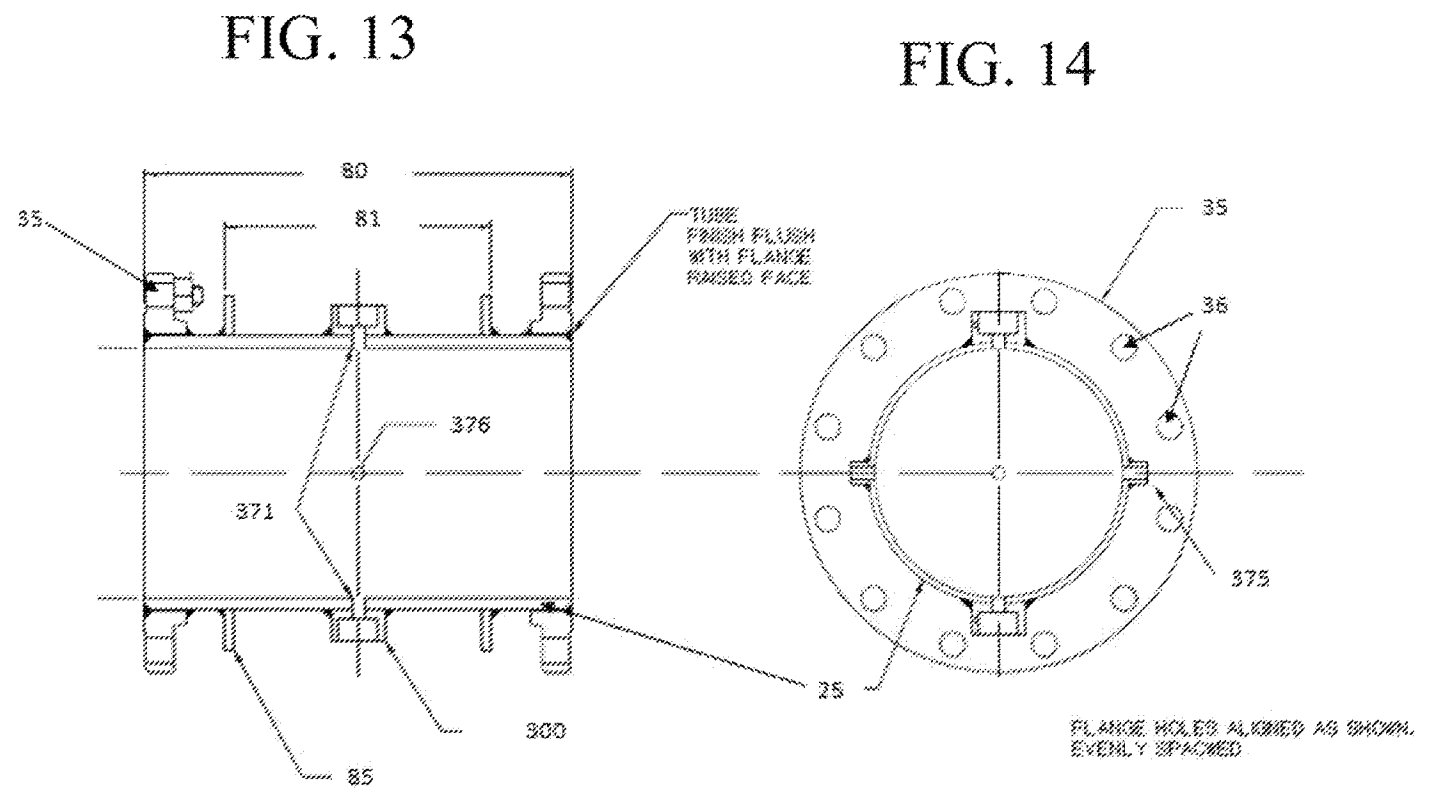

FIGS. 13 and 14 show details regarding the spool weldment to the housing 20. FIG. 13 shows a partial section of housing 20. Housing 20 can have a length of around 17.72 inches. The exterior surface of housing 20 preferably has rings 85, and in a preferred embodiment, there are two rings on the exterior surface of housing 20. In a preferred embodiment of the present invention, the two rings on the exterior surface of housing 20 are 10.75 inches apart with each ring 85 located 3.485 inches from the end of housing 20. Rings 85 are preferably CS Rings with a 14-inch outer diameter, a 10.812-inch inner diameter, and ¼ inch thickness. Also located on the exterior surface of housing 20 is boss 300, which is shown in greater detail in FIGS. 7 and 8. In a preferred embodiment of the present invention, boss 300 is located on the exterior surface of housing 20 equidistant from each end of housing 20. Boss 300 is preferably a TECO Electrode Boss 1000100 model. FIG. 13 also shows electrode receptacle thruholes 371 and diameter of electrode receptacle thruholes 376. FIG. 14 shows flange holes 36 of flange 35 and bushing 375. As shown in FIG. 14, in a preferred embodiment of the present invention, if the sectional view is thought of as the face of a clock, with part 36 as 1 o'clock, sensing electrodes are preferably placed at 9 o'clock and 3 o'clock, and ground electrodes are preferably placed at 12 o'clock and 6 o'clock.

FIGS. 15 and 16 show housing 20 with the liner 30 in place. In a preferred embodiment of the present invention, the single piece of partially stabilized magnesium zirconia ceramic liner 30 is preferably mechanically affixed to the metal tube via heat shrink (no adhesives). Specifically, the lining process preferably includes the following steps: heating the machined weldment to about 500° F., then holding for about 15 minutes, checking the temperature with an infrared thermometer, inserting the ceramic pipe to 0.05 inches offset on far end, holding in place until weldment temperature is below 150° F., and then checking the temperature with an infrared thermometer. Then, holes are drilled in the ceramic tube, preferably with a diamond sleeve drill and preferably using the electrode boss 300 for alignment. FIG. 15 shows setback of ceramic liner to flange face 31.

Figure 17:
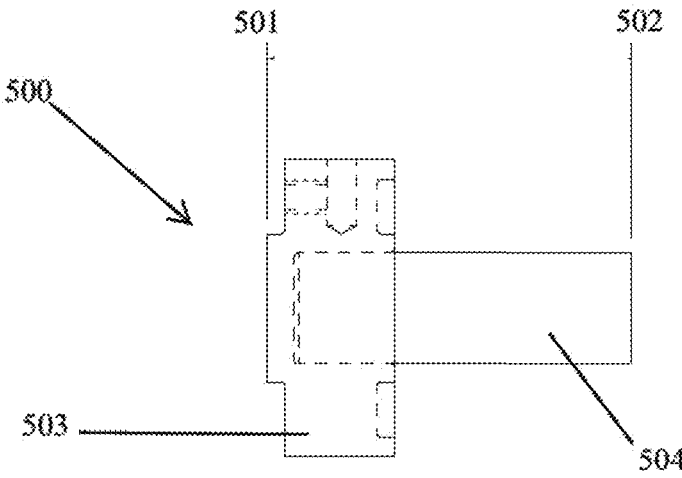
FIG. 17 is a preferred embodiment of an assembled sensing electrode of the present invention.

FIG. 17 shows an assembled two piece electrode 500 that has an exemplary length of about 1.23 inch. Electrode 500 seen in this figures is preferably sensing electrode 55. Electrode 500 includes head portion 503 and electrode portion 504. When the head 503 and electrode 504 are assembled, electrode 500 has two ends 501 and 502. The assembly of the two-piece electrode preferably includes the following steps: checking the bore of the hole with a go/no go gauge, checking the outer diameter of the electrode with the micrometer, cleaning the parts and lightly lubing with silicone spray, pressing with an arbor press to approximately 5000 lbs., and inspecting for overall length and no chips on the end 502 of electrode 500.

Figures 18, 19:
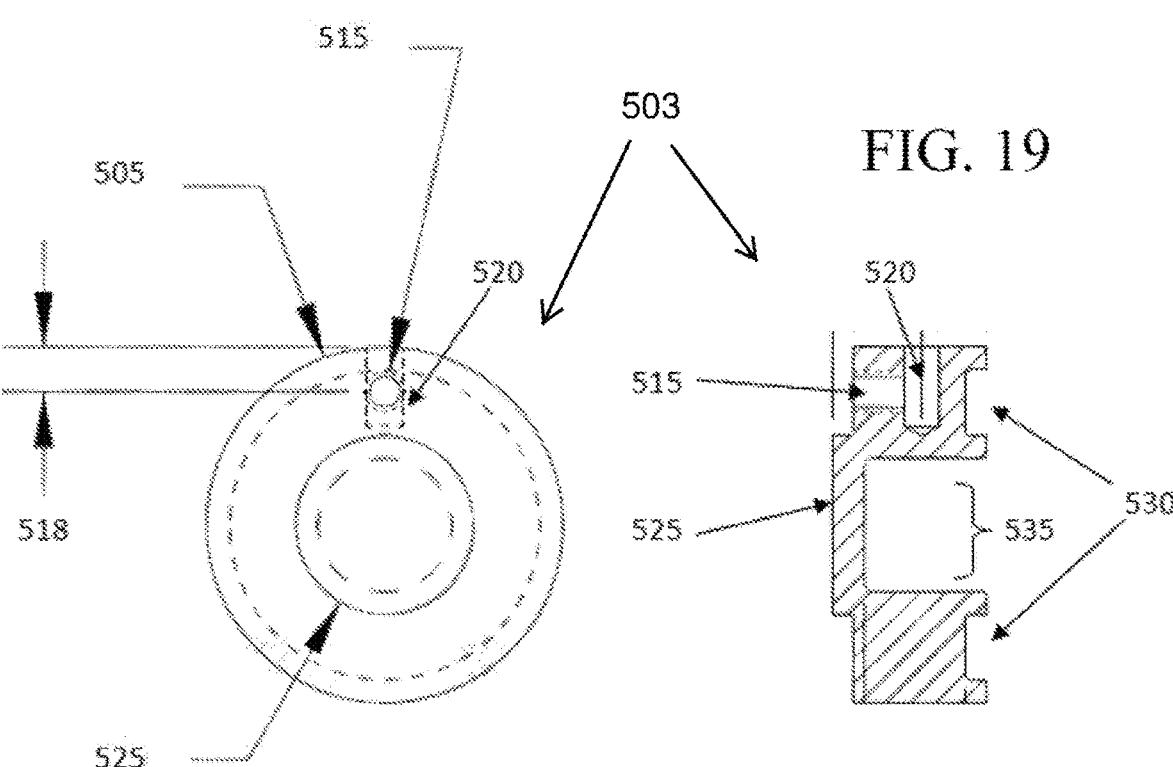
FIGS. 18 and 19 show various views of a preferred embodiment of the head portion of the two-piece electrode of the present invention.

FIGS. 18 and 19 show the details of head portion 503 of assembled two piece electrode 500. FIG. 18 shows a front end view of head portion 503. FIG. 19 shows a side view of head portion 503. Head portion 503 is preferably made of 304 STN STL. FIG. 18 shows location of electrode wire hole 515 and hole 520 for electrode wire and front end view of machined electrode head 505. FIG. 19 shows machined electrode head 525, sealing undercut 530, and recess for electrode 535.

FIGS. 20 and 21 show ground electrode 590, which preferably has a diameter of about 0.375 inches and preferably has a length of about 1.125 inches. Electrode 590 is preferably made of industrial grade tungsten carbide K10 (maximum 10% cobalt binder) and preferably has an outer diameter ground to about 16 micro inch or better and with both ends chamfered. FIGS. 54 and 55 show ground electrode 590.

Figures 24, 25:
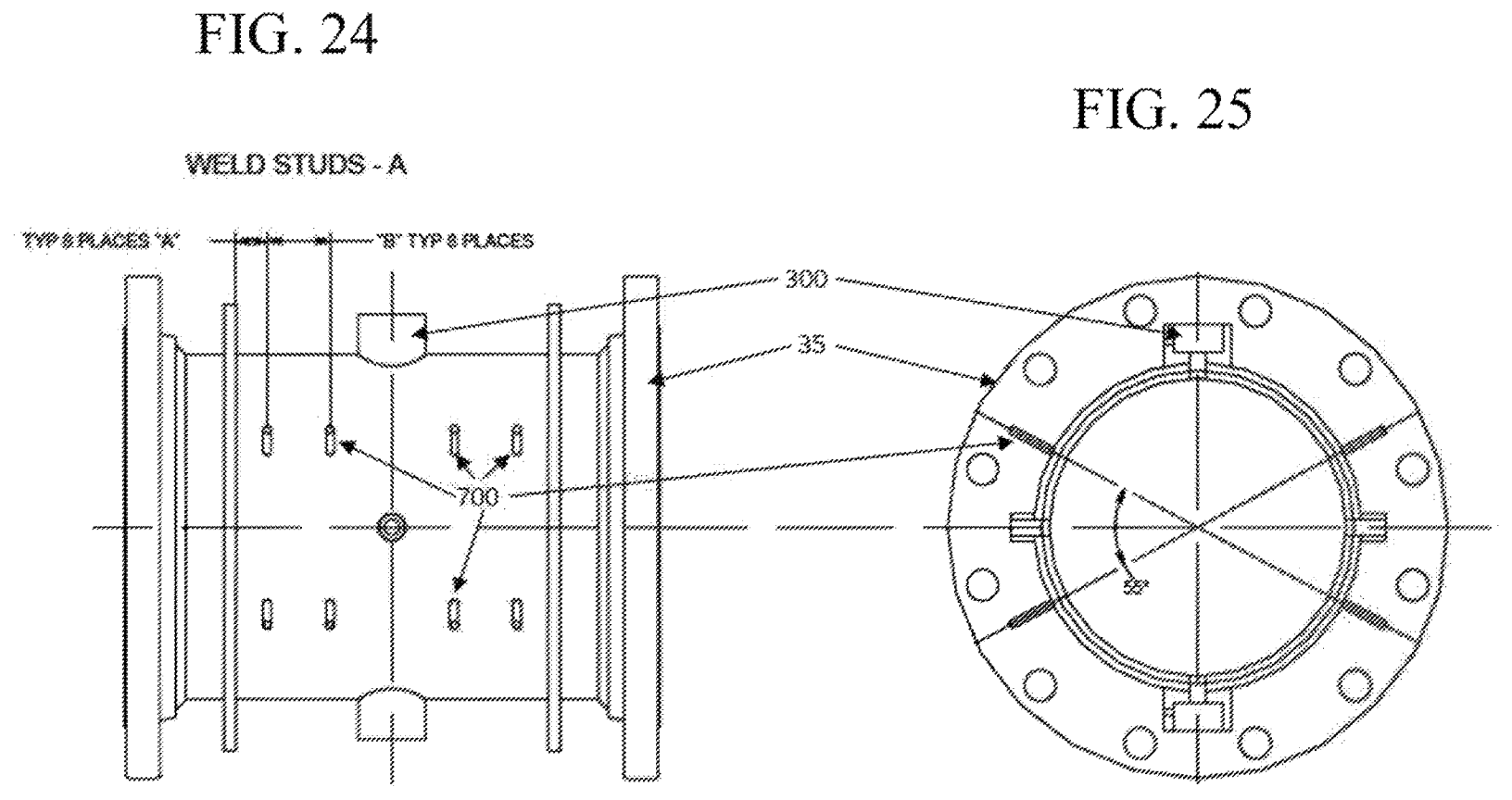
Figures 40, 41, 42:
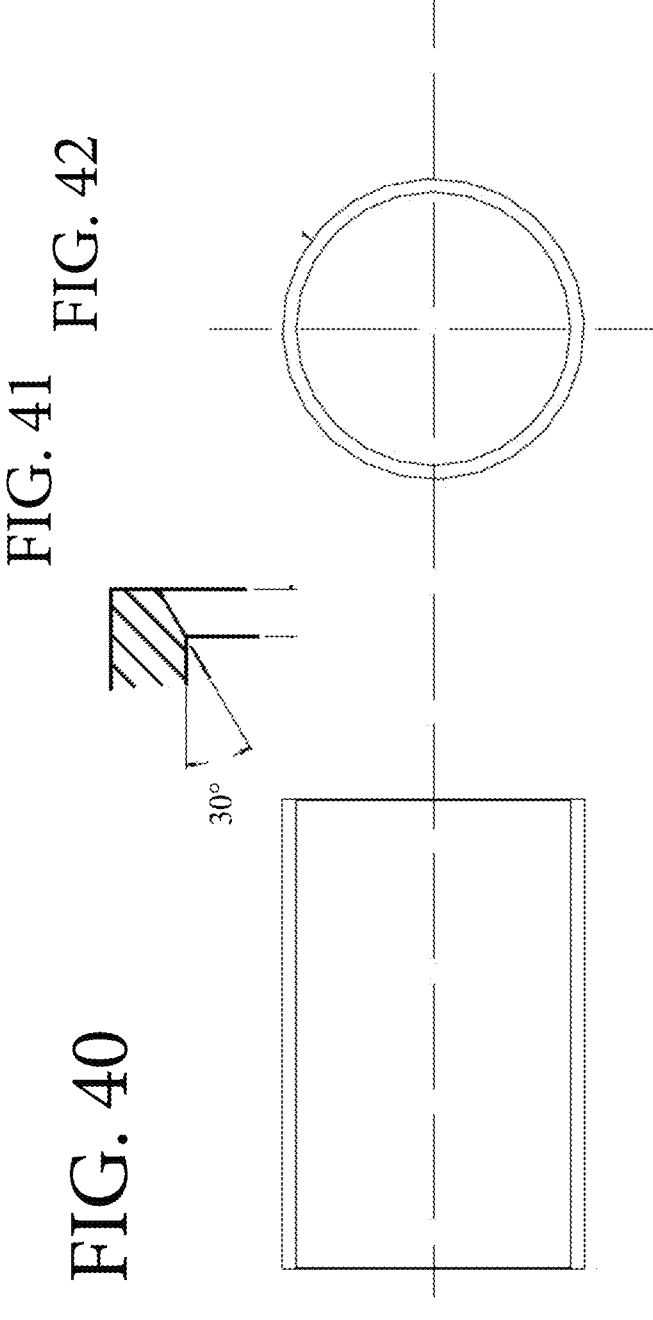
FIGS. 40-42 show various views of preferred embodiments of the lining of the present invention.

FIGS. 24 and 25 show a preferred embodiment of welding the magnetic coils 66, 67 to housing 20 with studs 700 for the magnetic coil hold down. A preferred embodiment of magnetic coil 400 is shown in FIGS. 39 and 40. Magnetic coil 400 includes windings 410 with thickness 430. FIG. 39 also shows finish-white lead 420 and start-black lead 421.

11

Figure 26:
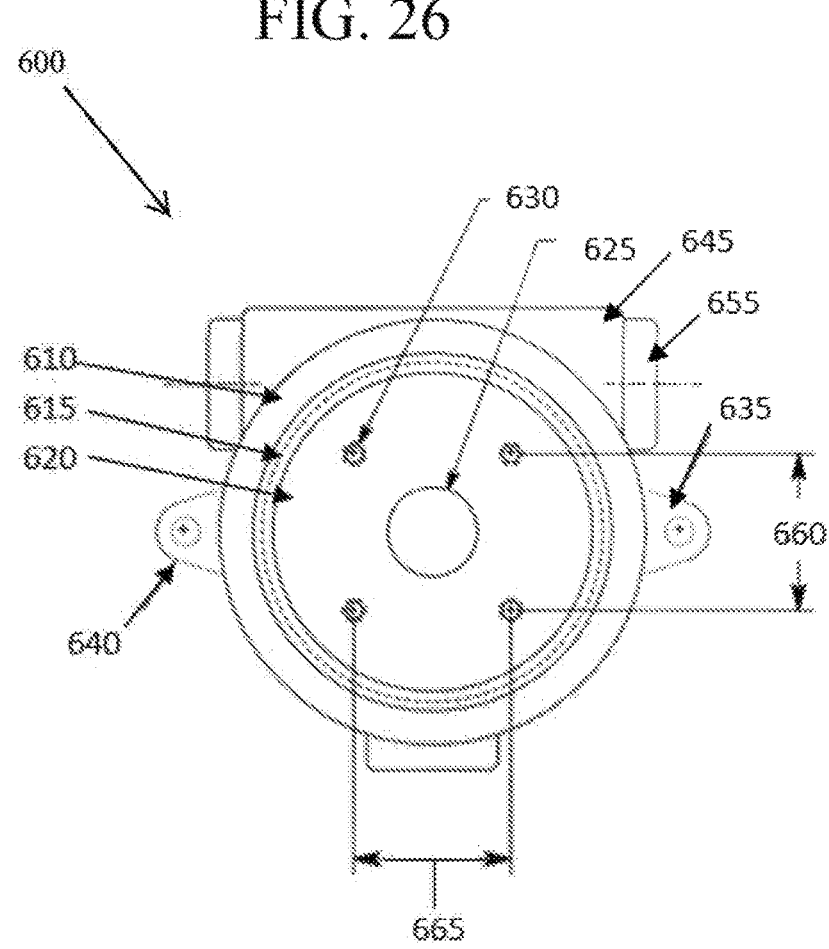
FIG. 26 shows of a preferred embodiment of the top of the junction box closure of the present invention.
Figure 35:
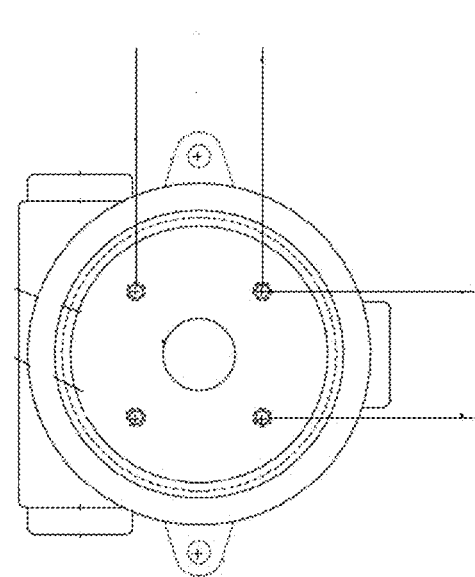
FIGS. 34 and 35 show various views of a preferred embodiment of the top of the junction box closure of the present invention.
Figure 34:
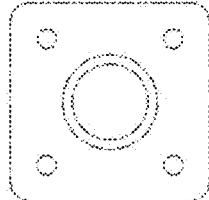

A preferred embodiment of junction box top 600 is shown in FIG. 26, and in FIGS. 34 and 35, that includes sealing ledge for cap 610, threads to attach cap 615, chamber for electrical termination 620, hole for wire access 625, and hold down hole 630. Junction box top 600 can include removable tabs 635, 640. As shown in FIG. 26, one side of top 600 includes shoulder 645 and back plate 655 that are preferably stubbed to top 600.

The black box shown in FIG. 31 can comprise a couple of components off the shelf. For example, one could use (1) a 12 VDC power supply, and (1) a Hilscher NetTap NT 50 (see link below):

https://www.hilscher.com/fileadmin/cms_upload/en-US/
        Resources/pdf/netTAP_NT_50_-_ Gateway_Devices_
        UM_12_EN.pdf As an example of a system of the present invention, one could include a TECO SAM as described herein, the black box mentioned above, and a Badger Meter Inc. magmeter secondary that has a Profibus DP output connected to the Hilscher NetTap NT 50. The NetTap NT 50 will translate that ProfibusDP signal and can have a PROFINET output.

The inventors developed this system in an effort to solve a customer problem (how do I use TECO's SAM if I have standardized on PROFINET as my communication protocol?). That customer may use a different set up that consists of a magmeter secondary from Endress+Hauser that that has a ProfibusDP output. The black box allows a different magmeter secondary to be used for customers desiring a PROFINET output.

It is possible and advantageous at times to supply both the TECO SAM primary and a secondary appropriate for a customer. Sometimes this system will include as well the black box mentioned above or a different black box with different translating componentry. Sometimes in a single kit there will be the TECO SAM primary and a secondary appropriate for a customer, and single packaging of the magmeter secondary and the translating componentry with a PROFINET output.

PARTS LIST

The following is a list of parts and materials suitable for use in the present invention:

| Parts Number | Description |
| --- | --- |
| 10 | magnetic flowmeter/magmeter |
| 17 | mounting element |
| 19 | plate |
| 20 | housing |
| 21 | openings |
| 25 | pipe |
| 30 | liner/lining |
| 31 | setback of liner to flange face |
| 35 | flange |
| 36 | flange holes |
| 40 | shell |
| 50 | junction box |
| 55 | sensing electrode |
| 60 | ground electrode |
| 65 | weld studs, coil hold down |
| 66, 67 | magnetic coils |
| 70 | neck of shell 40 |
| 80 | length between end flanges 35 |
| 81 | length between rings 85 |
| 85 | ring |
| 110 | Victaulic severe application meter (SAM) |
| 111 | Sleeve, Victaulic |
| 112 | MIG weld sleeve body |
| 113 | ceramic sleeve |

12

-continued

| Parts Number | Description |
| --- | --- |
| 130 | ceramic sleeve |
| 175 | coil wires |
| 176 | electrode wire |
| 180 | ISO lay length |
| 200 | hat |
| 210 | clearance hole for hold down screws |
| 220 | bolt circle of hold down screws |
| 230 | Outside Diameter of hat 200 |
| 240 | circumferential distance between clearance holes 210 |
| 250 | thickness of hat 200 |
| 251 | distance between bottom of clearance hole 210 and bottom of hat 200 |
| 252 | dimension |
| 253 | dimension |
| 254 | dimension |
| 255 | dimension |
| 256 | dimension |
| 257 | dimension |
| 258 | dimension |
| 300 | boss |
| 310 | threaded holes for hold down screws |
| 311 | 10-32 UNF-2B |
| 315 | hole, electrode wire |
| 320 | inside diameter of boss 300 |
| 325 | outside diameter of boss 300 |
| 330 | hole for electrode insulator |
| 335 | angle locating Electrode Wire Hole |
| 340 | angle locating angular spacing of hold down screws |
| 345 | vertical datum |
| 350 | height of boss 300 |
| 355 | depth of boss ID |
| 360 | depth of threaded holes for hold down screws 310 |
| 365 | location of Electrode Wire Hole |
| 370 | radius of mating pipe |
| 371 | electrode receptacle thruholes |
| 375 | bushing |
| 376 | diameter of electrode receptacle thruholes |
| 400 | magnetic coil |
| 410 | windings |
| 420 | finish-white lead |
| 421 | start-black lead |
| 430 | thickness of windings 410 |
| 431 | width of coil 400 |
| 432 | length of coil 400 |
| 433 | thickness of coil 400 |
| 500 | assembled two-piece electrode |
| 501 | end of electrode head |
| 502 | end of electrode that touches fluid |
| 503 | electrode head |
| 504 | electrode |
| 505 | machined electrode head |
| 515 | location of electrode wire hole |
| 518 | length between top of electrode head 503 and middle of location of electrode wire hold 515 |
| 520 | hole, electrode wire |
| 525 | machined electrode head |
| 530 | sealing undercut |
| 535 | recess for electrode |
| 580 | sensing electrode |
| 590 | ground electrode |
| 600 | junction box top closure |
| 610 | sealing ledge for cap |
| 615 | threads to attach cap |
| 620 | chamber for electrical termination |
| 625 | hole for wire access |
| 630 | hold down hole |
| 635 | removable tabs |
| 640 | removable tabs |
| 645 | shoulder |
| 655 | back plate |
| 660 | length between hold down holes 630 |
| 665 | length between hold down holes 630 |
| 700 | Studs, Magnetic coil hold down |

More information about the present invention is included in the documents attached to U.S. Provisional Patent Application Ser. No. 62/581,385, filed 3 Nov. 2017, and hereby incorporated herein by reference entitled "TECO-SAM-Fracking-R1.pdf"; "FlangeBoltSpecificationTighteningSequence.pdf"; "UniMagInstallationInstructions.pdf"; and "ProductSpecificationProfiNETSAM.pdf".

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A flow measurement system comprising:
a primary and a secondary,
with the primary comprising:
a flow tube or pipe having two opposing ends, one or more electrodes comprising stainless steel, and integrated with a magnetic system,
wherein the flow tube or pipe is at least partially lined with liner having corrosion resistance and comprising partially stabilized magnesium zirconia (MgPSZ) material;
wherein the liner is mechanically affixed to the flow tube or pipe via heat shrink and without use of adhesives;
with the secondary comprising a power supply with a synchronized measurement circuitry; and
wherein the primary is tolerant of or configurable to electrical properties of the secondary and operably mates with the secondary.

2. The system of claim 1, wherein the liner further comprises an abrasion resistant ceramic trim.

3. A method of measuring flow using the system of claim 1.

4. The system of claim 1, wherein the system meets requirements for operation in Hazardous areas designated as Class I Division 2.

5. The system of claim 1, wherein the primary further comprises a grooved end fitting at each end of the flow tube or pipe.

6. The system of claim 1, wherein the primary further comprises a flange at each end of the flow tube or pipe.

7. The system of claim 1, wherein the flow tube or pipe comprises metal.

8. The system of claim 1, wherein the flow tube or pipe is coated with epoxy.

9. A magnetic flowmeter comprising:
a. a pipe or tube having an exterior surface and an interior surface, wherein the pipe or tube is at least partially lined on the interior surface with a liner comprising partially stabilized magnesium zirconia (MgPSZ), wherein the liner is mechanically affixed to the pipe or tube via heat shrink and without use of adhesives;
b. at least one coil for generating a magnetic field affixed to the exterior surface of the pipe or tube and having an electrical connection;
c. one or more electrodes having wiring and affixed to the pipe or tube;
d. a shell enclosure, having a tubular neck protrusion, that surrounds the exterior of said coil and is affixed to said coil; and
e. wherein the electrical connection of said coil and the wiring of the one or more electrodes are threaded through the neck of said shell and connected to a junction box having a circuit board for operation.

10. The magnetic flowmeter of claim 9, wherein at least one or the electrodes is made of industrial grade tungsten carbide.

11. A flow measurement system comprising the flowmeter of claim 10 and a secondary, wherein the secondary comprises a power supply with a synchronized measurement circuitry; and wherein the magnetic flowmeter is tolerant of or configurable to electrical properties of the secondary and operably mates with the secondary.

12. A method of measuring flow using the system of claim 11.

13. The magnetic flowmeter of claim 9, wherein at least one or the electrodes comprises stainless steel.

14. A flow measurement system comprising the flowmeter of claim 13 and a secondary, wherein the secondary comprises a power supply with a synchronized measurement circuitry; and wherein the magnetic flowmeter is tolerant of or configurable to electrical properties of the secondary and operably mates with the secondary.

15. A method of measuring flow using the system of claim 14.

16. A flow measurement system comprising the flowmeter of claim 9 and a secondary, wherein the secondary comprises a power supply with a synchronized measurement circuitry; and wherein the magnetic flowmeter is tolerant of or configurable to electrical properties of the secondary and operably mates with the secondary.

17. A method of measuring flow using the system of claim 16.

18. The magnetic flowmeter of claim 9, wherein the pipe or tube has two opposing ends with a grooved end fitting at each of said ends.

19. The magnetic flowmeter of claim 9, wherein the pipe or tube has two opposing ends with a flange at each of said ends.

20. The magnetic flowmeter of claim 9, wherein the exterior surface of the pipe or tube is coated with epoxy.

* * * * *